United States Patent Office 3,016,354
Patented Jan. 9, 1962

3,016,354
REACTIVATION OF PLATINUM CATALYSTS
Saul Gerald Hindin, Wilmington, Del., and George Alexander Mills, Swarthmore, Pa., assignors to Houdry Process Corporation, Wilmington, Del., a corporation of Delaware
No Drawing. Filed Dec. 2, 1952, Ser. No. 323,722
7 Claims. (Cl. 252—413)

This invention relates to an improved method for reactivating used platinum catalysts, more particularly platinum-containing catalysts such as those used in the hydrogenative reforming of liquid hydrocarbons in the boiling range of gasoline or naphtha.

Platinum catalysts used in the hydrogenative reforming of gasoline or other naphthas generally comprise a porous support material, such as adsorptive alumina, impregnated with a relatively small amount of platinum which may be present as free metal or associated with the support as a chemical complex. After extended use in hydrogenative reforming processes these catalysts lose activity to the point where further use is not feasible or is not economically desirable, so that replacement of the catalyst is necessary unless convenient means are available to effect reactivation thereof. Complete replacement of the used catalyst is, of course avoided, or postponed as long as possible, because of the very high replacement cost of the platinum contained in the catalyst.

Reactivation of these used platinum catalysts is a uniquely difficult problem because of the relative inertness of the platinum to chemical reagents and solvents and the fact that such agents may also effect dissolution of the support. The use of aqua regia has been proposed to dissolve the platinum values in used platinum catalysts but this reagent is so reactive that it also readily dissolves the catalyst support materials, such as the aluminas used in commercial platinum catalysts. The recovery of platinum from the thus contaminated aqua regia solution is relatively complicated and the original catalyst support material is of reduced value for future use as a catalyst support. In addition, aqua regia, by virtue of its great chemical reactivity, requires the use of expensive processing equipment fabricated from special chemical resistant metals and alloys. In addition to the drawbacks set out above, involved when nitrate is present in the platinum recovery solution, it appears that a variety of platinum nitrate complexes tend to be formed which interfere with purification of the platinum and necessitate involved procedures for removal of the nitrate.

These disadvantages can be overcome by the use of the method of the present invention, one embodiment of which is based upon the discovery that used catalysts containing platinum supported on adsorptive aluminas can be reactivated by treating the catalyst with concentrated hydrochloric acid in the presence of added oxygen to oxidize and dissolve at least a portion of the platinum in the catalyst, and heating the resulting mixture to first evaporate its liquid components and finally its vaporizable constituents at calcining temperatures. While hydrochloric acid is the preferred halogen acid, the other halogen acids namely HBr, HI and HF may be employed but not necessarily with equal effectiveness.

Another embodiment of the invention, which is preferably employed after the catalyst has been reactivated a number of times, comprising treating the used catalyst described above with concentrated hydrochloric acid in the presence of added oxygen until a substantial portion of the platinum in the catalyst has been oxidized and dissolved in the acid. The acid solution of platinum is then separated from the solids components of the catalyst. This acid platinum solution may then be used to impregnate a quantity of fresh catalyst support material in conventional manner. Alternatively, the dissolved platinum may be recovered from the separated acid solution by suitable means, and then redissolved to prepare a fresh platinum solution for impregnating a quantity of fresh support material.

In either of these embodiments, whether the platinum is redeposited in the original support or is separated therefrom as a solution and employed in impregnation of a new or reconstituted support, it is important to avoid the use of compounds containing or forming nitrate ($NO_3$) ions which tend to produce more or less stable platinum complexes interfering with recovery of the platinum metal.

The required oxygen employed may be supplied by oxygen-containing gas mixtures, such as air, or by oxygen-containing compounds, other than nitrogen-oxide compounds, capable of releasing free oxygen under the treating conditions employed.

Besides oxygen, other suitable oxidizing agents capable of oxidizing metallic platinum in the presence of concentrated hydrochloric acid may be used. For example, the halogens: chlorine, bromine and iodine, particularly chlorine, may be used instead of oxygen, but not necessarily with equal results. The halogens are more soluble in hydrochloric acid solutions than oxygen, and by using more or less saturated hydrochloric acid solutions of halogens, especially chlorine, the finely divided platinum in the used catalyst is readily oxidized and dissolved in the methods of operation described below.

The term "concentrated hydrochloric acid" as used herein is intended to include aqueous solutions containing from about 5 to 40 percent by weight hydrogen chloride.

The presence of added oxygen or other oxidizing agent in the system when the used catalyst is treated with concentrated hydrochloric acid to dissolve platinum from the support material may be assured in any convenient manner. For example, air, oxygen or halogen gas may be bubbled through the acid, while the catalyst is treated with the acid, in a manner such that the acid will at all times during the treating operation be saturated with air or other oxidizing agent. The rate of solution of the platinum in the acid may be increased by contacting the used catalyst with hydrochloric acid in a closed system at elevated temperature and suitable oxygen or halogen partial pressures.

The following example will more clearly illustrate the method of the invention.

*Example*

In this embodiment the used catalyst, which has declined in activity after extended use in hydrogenative reforming of naphtha, is reactivated without separating the dissolved platinum from the alumina support. The catalyst comprises 0.5% by weight platinum on a commercial activated alumina support, prepared by impregnation of acetic acid leached alumina with chloroplatinic acid and reduction of the impregnated product in a hydrogen stream.

About 55 parts of the used catalyst are boiled with about 40 parts of concentrated hydrochloric acid, containing about 39% by weight of hydrogen chloride, for 4 hours while air in the form of finely dispersed bubbles is continuously bubbled through the mixture of catalyst and acid in intimate contact with the catalyst. Without separating the acid, the resulting mixture is evaporated to dryness in an oven at 260° F., then calcined for an hour at about 500 to 600° F., and then reduced in a stream of hydrogen at 950° F. and 300 p.s.i.g. (pounds per square inch gauge).

By this treatment spent catalyst having an activity corresponding to 10 to 12% conversion of methylcyclopentane to aromatics (at 950° F., 300 p.s.i.g., and a liquid space rate of 3 volumes oil per hour per volume of catalyst) is brought to an activity level corresponding to over 30 to about 35% conversion of the methylcyclopentane under the same operating conditions.

The same procedure described in the foregoing example may be employed using atmospheric air or halogen gas such as chlorine or bromine, instead of the described oxygen stream, with considerable enhancement of the catalyst activity.

In the example given above, that is, when either air, oxygen or halogen have been used as the oxidizing agent, after the used catalyst has been sufficiently contacted with the concentrated hydrochloric acid and oxidizing agent, the acid solution may be separated from the treated catalyst and used directly to impregnate a quantity of fresh catalyst support material with the platinum solution obtained. A single treatment of used catalyst with concentrated acid and oxidizing agent has been found to extract more than 90% of the platinum in the used catalyst. Several such treatments may be used in succession on a quantity of used catalyst to extract substantially all of the platinum from the catalyst.

The acidic platinum extract solutions prepared as described above may, of course, be treated to separate impurities and catalyst poisons from the platinum solution in any suitable manner before the solution is used to impregnate catalyst support material with platinum.

Obviously many modifictaions and variations of the invention as hereinbefore set forth may be made without departing from the spirit and scope thereof, and therefore only such limitations should be imposed as are indicated in the appended claims.

We claim as our invention:

1. A process for reactivating a catalyst containing platinum supported on adsorptive alumina which comprises the step of treating the catalyst with concentrated aqueous halogen acid while finally dispersed bubbles of a gaseous oxidizing agent selected from the group consisting of air, oxygen and halogens is passed through the aqueous acid to dissolve at least a portion of the platinum without dissolving the adsorptive alumina support to a significant extent by reason of the restriction of the quantity of the halogen acid to only a small fraction of the quantity stoichiometrically necessary for dissolving all of the alumina and heating the mixture of catalyst and acid containing the oxidizing agent under conditions to effect vaporization of water and other vaporizable components from the aqueous solution with resulting redeposition of platinum compounds in the adsorptive alumina support.

2. A process according to claim 1, wherein the added oxidizing agent comprises free oxygen.

3. A process according to claim 1, wherein the added oxidizing agent is a halogen.

4. A process according to claim 3, wherein the added oxidizing agent is chlorine.

5. The method of reactivating supported platinum catalyst which comprises intimately contacting the catalyst with concentrated aqueous hydrochloric acid containing from about 5 to 40 percent by weight hydrogen chloride while air in the form of finely dispersed bubbles is passed through the acid in intimate contact with the catalyst to dissolve at least a portion of the platinum in the catalyst and evaporating the resulting mixture of undissolved catalyst and solution to dryness at an elevated temperature, and calcining the dried material at an elevated temperature.

6. The method of reactivating an alumina supported platinum catalyst which comprises intimately contacting the catalyst with an aqueous hydrochloric acid solution containing from 5 to 30 percent by weight of hydrochloric acid while chlorine gas is bubbled through the said aqueous solution to dissolve at least a portion of the platinum without dissolving the alumina support to a significant extent, evaporating the resulting mixture of undissolved catalyst and solution to dryness at an elevated temperature, and calcining the dried material at an elevated temperature.

7. A process for reactivating a catalyst containing platinum supported on adsorptive alumina which comprises the step of treating the catalyst with concentrated aqueous halogen acid while finally dispersed bubbles of air are passed through the aqueous acid to dissolve at least a portion of the platinum without dissolving the adsorptive alumina support to a significant extent by reason of the restriction of the quantity of the halogen acid to a small fraction of the quantity stoichiometrically necessary for dissolving all of the alumina.

References Cited in the file of this patent

UNITED STATES PATENTS

| | | |
|---|---|---|
| 1,904,582 | Watts | Apr. 18, 1933 |
| 2,246,900 | Schulze et al. | June 24, 1941 |
| 2,407,701 | Jones et al. | Sept. 17, 1946 |
| 2,439,852 | Jackson | Apr. 20, 1948 |

FOREIGN PATENTS

| | | |
|---|---|---|
| 289,220 | Great Britain | Apr. 26, 1928 |